(12) United States Patent
Niino et al.

(10) Patent No.: US 8,140,233 B2
(45) Date of Patent: Mar. 20, 2012

(54) BRAKING CONTROL DEVICE

(75) Inventors: Hiroaki Niino, Toyota (JP); Yoshiyuki Yasui, Nagoya (JP); Takashi Sato, Okazaki (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 852 days.

(21) Appl. No.: 12/171,474

(22) Filed: Jul. 11, 2008

(65) Prior Publication Data

US 2009/0024289 A1 Jan. 22, 2009

(30) Foreign Application Priority Data

Jul. 17, 2007 (JP) .................................. 2007-185780

(51) Int. Cl.
*B60T 8/40* (2006.01)
(52) U.S. Cl. ......................................................... 701/70
(58) Field of Classification Search ...................... 701/70
See application file for complete search history.

(56) References Cited

U.S. PATENT DOCUMENTS

| | | | |
|---|---|---|---|
| 5,842,751 A | 12/1998 | Unterforsthuber | |
| 5,869,943 A * | 2/1999 | Nakashima et al. | 318/586 |
| 6,119,062 A * | 9/2000 | Proger et al. | 701/70 |
| 6,142,581 A | 11/2000 | Yamaguchi et al. | |
| 6,322,164 B1 * | 11/2001 | Sakamoto et al. | 303/115.4 |
| 6,334,655 B2 * | 1/2002 | Tanaka et al. | 303/113.4 |
| 6,412,881 B1 * | 7/2002 | Isono | 303/114.1 |
| 6,460,944 B2 * | 10/2002 | Isono et al. | 303/159 |
| 6,813,553 B2 * | 11/2004 | Nakamura et al. | 701/70 |
| 7,058,498 B2 * | 6/2006 | Kano et al. | 701/67 |
| 7,290,841 B2 * | 11/2007 | Isono | 303/114.1 |
| 7,309,112 B2 * | 12/2007 | Isono | 303/11 |
| 2001/0038243 A1 * | 11/2001 | Isono | 303/116.1 |
| 2002/0008426 A1 * | 1/2002 | Isono | 303/115.4 |
| 2004/0019423 A1 * | 1/2004 | Yasui et al. | 701/71 |
| 2005/0251316 A1 * | 11/2005 | Kato et al. | 701/70 |
| 2008/0100129 A1 * | 5/2008 | Lubbers | 303/113.1 |
| 2008/0255744 A1 * | 10/2008 | Yasui et al. | 701/70 |

FOREIGN PATENT DOCUMENTS

| | | |
|---|---|---|
| JP | 09-030385 A | 2/1997 |
| JP | 09-323641 A | 12/1997 |

* cited by examiner

*Primary Examiner* — Joanne Silbermann
*Assistant Examiner* — Michael Stabley
(74) *Attorney, Agent, or Firm* — Buchanan Ingersoll & Rooney PC

(57) ABSTRACT

Braking discomfort applied to the driver is minimized. Provided are a brake operation amount section (26) capable of detecting a brake operation before a master cylinder hydraulic pressure is generated; an estimation section (28) for estimating the hydraulic pressure generation timing at which the master cylinder hydraulic pressure is generated, on the basis of detection information of the brake operation amount section (26); and a hydraulic pressure control section (29) for controlling the operation of an assist hydraulic pressure generation mechanism (D) by using the hydraulic pressure generation timing estimated by the estimation section (28) as a reference.

6 Claims, 6 Drawing Sheets

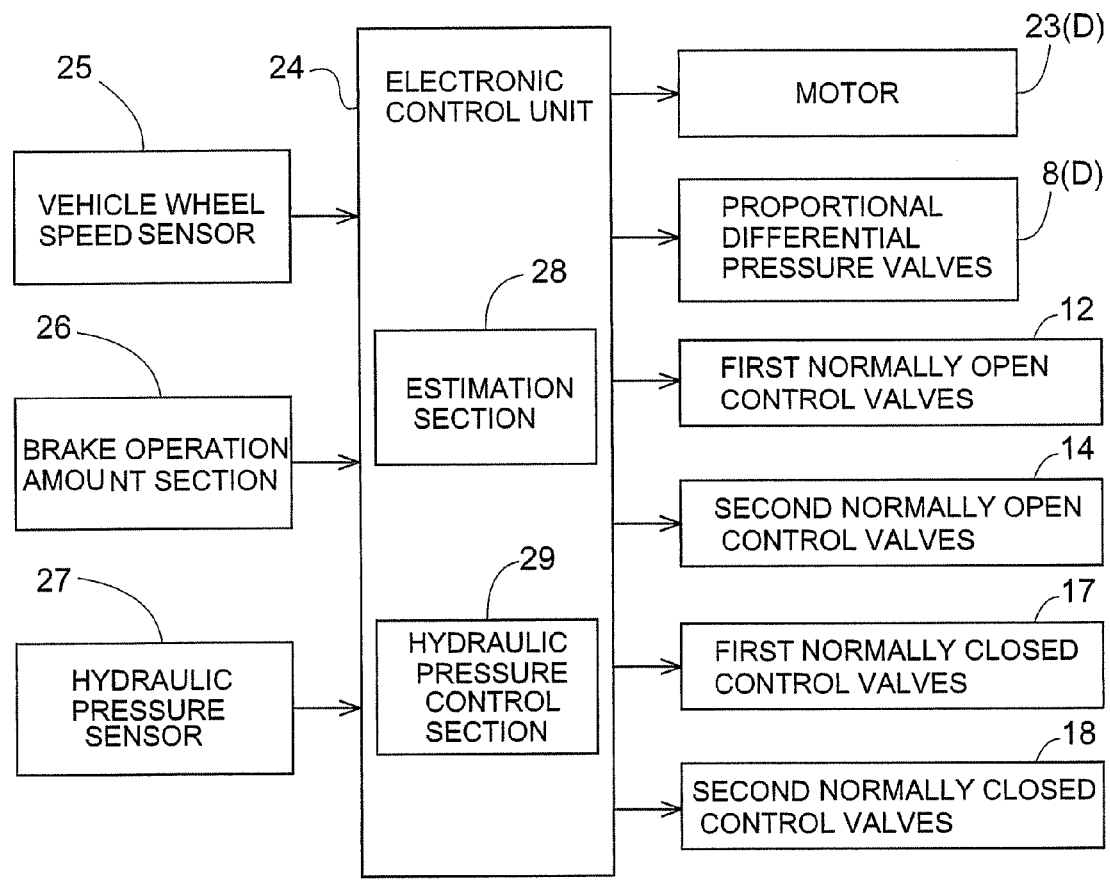

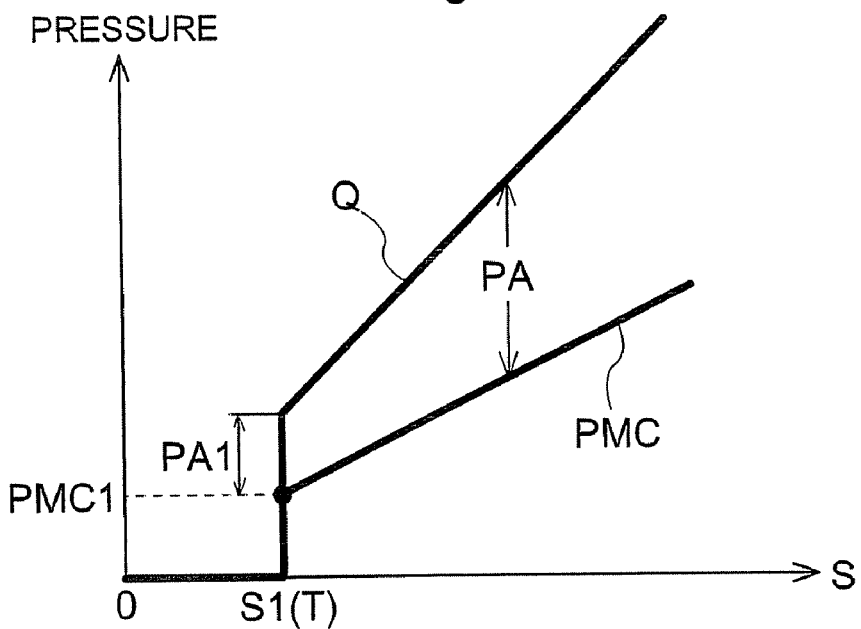
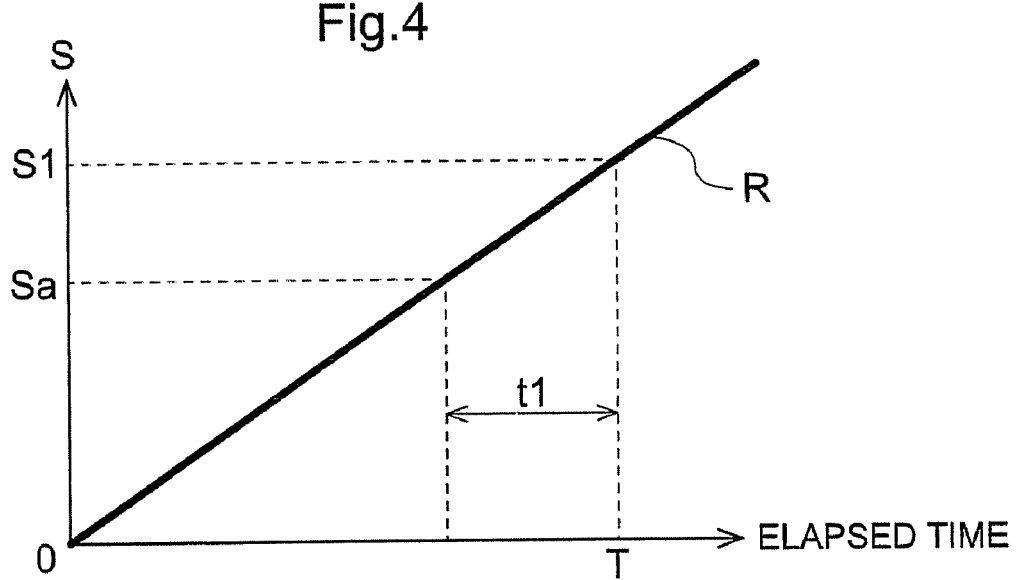

Fig.5
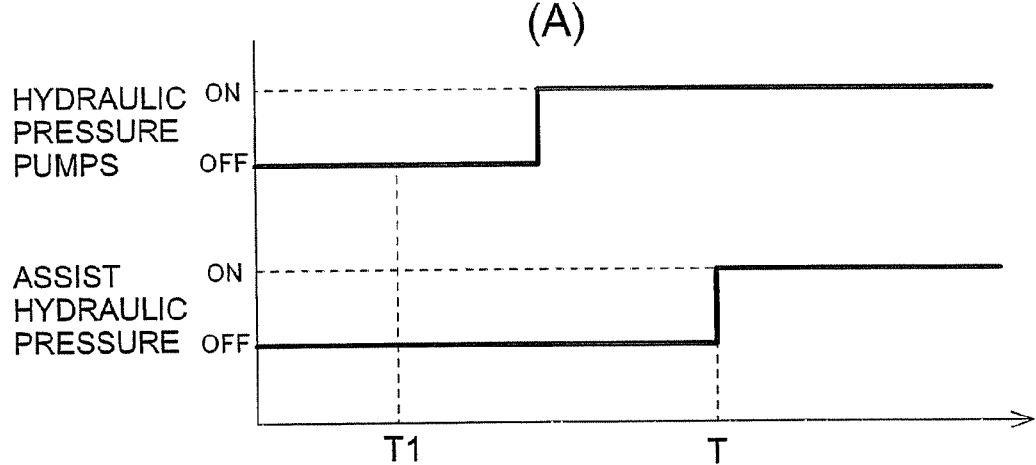
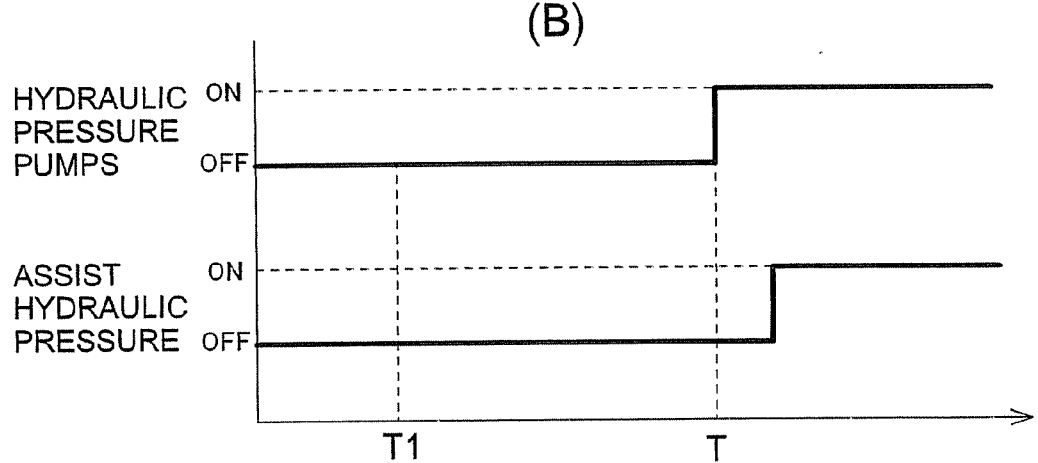
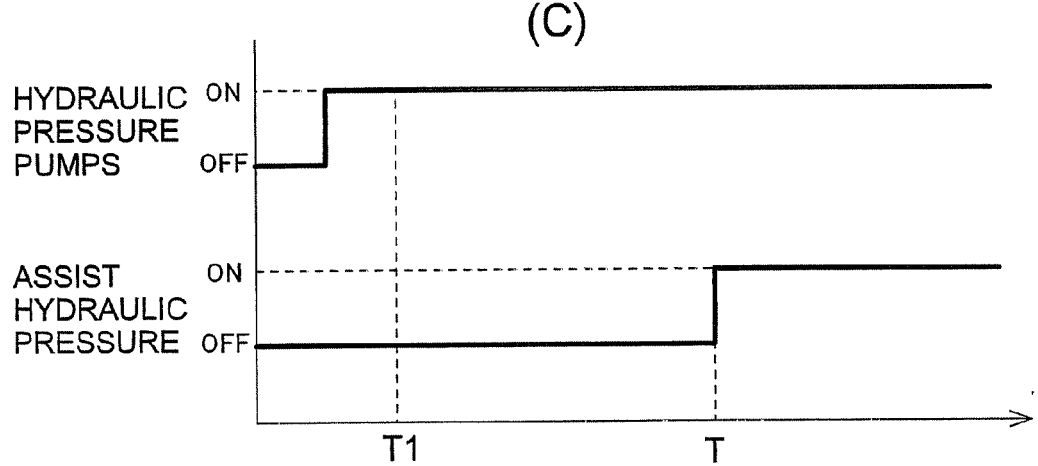

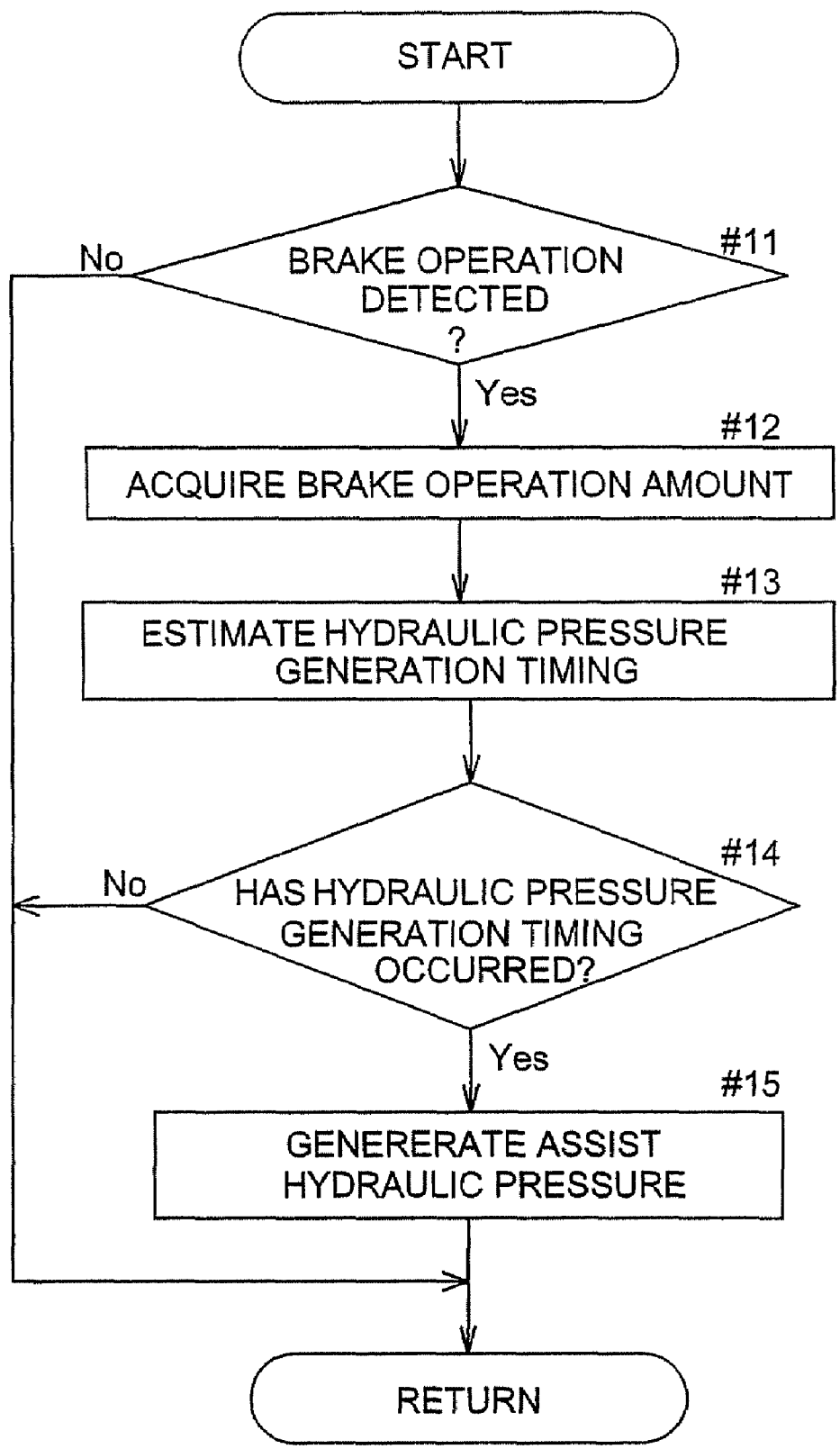

BRAKING CONTROL DEVICE

BACKGROUND OF THE INVENTION

1. Field of the Invention

The present invention relates to a braking control device that is provided with a hydraulic pressure circuit for applying a master cylinder hydraulic pressure generated by a master cylinder to the wheel cylinders of each vehicle wheel, and an assist hydraulic pressure generation mechanism for adding an assist hydraulic pressure to the master cylinder hydraulic pressure using the pressure of a pump in the hydraulic pressure circuit.

2. Description of the Related Art

In a braking control device such as the one described above, the master cylinder amplifies the brake operation force of the driver to generate a master cylinder hydraulic pressure, and applies the master cylinder hydraulic pressure to the wheel cylinders. Providing an assist hydraulic pressure generation mechanism having a pump, control valves, and other components makes it possible to apply an assist hydraulic pressure in addition to the master cylinder hydraulic pressure to the wheel cylinders.

In a conventional braking control device, until the hydraulic pressure generation timing at which the assist hydraulic pressure is generated, only the master cylinder hydraulic pressure is applied to the wheel cylinders. When the hydraulic pressure generation timing is reached, the assist hydraulic pressure generation mechanism is activated, and the assist hydraulic pressure is applied to the wheel cylinders in addition to the master cylinder hydraulic pressure (see Patent Documents 1 and 2, for example).

In the braking control device disclosed in Patent Document 1, a booster device is provided for amplifying the brake operating force and inputting the amplified force to the master cylinder, and the time at which the brake operating force exceeds the boost limit at which the booster device no longer boosts the brake operating force to a prescribed ratio is detected as the hydraulic pressure generation timing.

In the braking control device disclosed in Patent Document 2, the time at which the current vehicle wheel deceleration becomes greater than a prescribed deceleration, or the time at which the operation amount of the brake pedal becomes greater than a prescribed operation amount is detected as the hydraulic pressure generation timing.

[Patent Document 1] JP (Kokai) No. 9-30385
[Patent Document 2] JP (Kokai) No. 9-323641

SUMMARY OF THE INVENTION

In the conventional braking control devices described above, the hydraulic pressure generation timing is detected in the state in which only the master cylinder hydraulic pressure is applied to the wheel cylinders in order to transition to the state in which the assist hydraulic pressure is additionally applied. Consequently, until the assist hydraulic pressure is added after the hydraulic pressure generation timing, a time delay occurs while computational processing is performed to detect the hydraulic pressure generation timing. There is therefore a lack of smoothness in the transition from applying only the master cylinder hydraulic pressure to the wheel cylinders to additionally applying the assist hydraulic pressure, and there is a risk of applying discomfort to the driver with respect to brake operation.

In Japanese Laid-open Patent Publication No. 9-323641, the configuration allows for adding the assist hydraulic pressure at substantially the same time that the master cylinder hydraulic pressure is generated by the master cylinder. However, the assist hydraulic pressure is added after computational processing is performed for detecting generation of the master cylinder hydraulic pressure in this case as well. Consequently, between the time the master cylinder hydraulic pressure is generated and the time the assist hydraulic pressure is added, a time delay occurs while computational processing is performed to detect generation of the master cylinder hydraulic pressure.

The present invention was developed in view of the problems described above, and an object of the present invention is to provide a braking control device capable of minimizing braking discomfort applied to the driver.

In order to achieve these objects, an aspect of the braking control device of the present invention is a braking control device for a vehicle having a master cylinder for amplifying a brake operating force and generating a master cylinder hydraulic pressure; a hydraulic circuit for applying the master cylinder hydraulic pressure to a wheel cylinder of each vehicle wheel; and an assist hydraulic pressure generation mechanism for adding an assist hydraulic pressure to the master cylinder hydraulic pressure through pressure of a pump in the hydraulic circuit; wherein the braking control device comprises a brake operation detection section for detecting a brake operation before the master cylinder hydraulic pressure is generated; an estimation section for estimating a hydraulic pressure generation timing at which the master cylinder hydraulic pressure is generated, on the basis of detection information of the brake operation detection section; and a hydraulic pressure control section for controlling operation of the assist hydraulic pressure generation mechanism by using the hydraulic pressure generation timing estimated by the estimation section as a reference.

Since the operation of the assist hydraulic pressure generation mechanism is controlled, and the reference for the timing at which the assist hydraulic pressure is added is the hydraulic pressure generation timing estimated by the estimation section, the assist hydraulic pressure can be added in conjunction with generation of the master cylinder hydraulic pressure, without computational processing for detecting generation of the master cylinder hydraulic pressure. Consequently, there is no time delay resulting from computational processing for detecting generation of the master cylinder hydraulic pressure between generation of the master cylinder hydraulic pressure and addition of the assist hydraulic pressure. As a result, the assist hydraulic pressure can be smoothly added in conjunction with generation of the master cylinder hydraulic pressure, and braking discomfort applied to the driver can be minimized.

In another aspect of the braking control device of the present invention, the brake operation detection section detects a brake operation amount, and the hydraulic pressure control section controls the assist hydraulic pressure generation mechanism to add the assist hydraulic pressure on the basis of detection information of the brake operation amount detection section.

Since the brake operation amount detection section is used to estimate the hydraulic pressure generation timing, in comparison to a section or the like that merely detects an ON/OFF state of brake operation, for example, brake operation prior to generation of the master cylinder hydraulic pressure can be precisely monitored, and the hydraulic pressure generation timing can be precisely estimated. The brake operation amount detection section is also used not only to estimate the hydraulic pressure generation timing, but also for the assist hydraulic pressure generation mechanism to add the assist hydraulic pressure, and the structure can therefore be simplified.

In yet another aspect of the braking control device of the present invention, the estimation section is configured so as to estimate the hydraulic pressure generation timing according to an amount of variation of the brake operation amount per a prescribed time on the basis of the detection information of the brake operation amount detection section.

Since the estimation section thus estimates the hydraulic pressure generation timing, even when the amount of brake operation per prescribed time is varied by the driver applying the brake in various different ways, the hydraulic pressure generation timing can be estimated in accordance with the amount of brake operation after the variation, and the hydraulic pressure generation timing can be precisely estimated.

In still another aspect of the braking control device of the present invention, a brake operation degree detection section, instead of the brake operation detection section, detects a degree of brake operation in order to add the assist hydraulic pressure is provided in addition to the brake operation detection section.

Through the use of the brake operation degree detection section, the assist hydraulic pressure can be added according to the degree of brake operation. Since the brake operation degree detection section is used to add the assist hydraulic pressure in this manner, the brake operation detection section may merely be a section for detecting the ON/OFF state of brake operation, for example, and the structure can be simplified.

In another aspect of the braking control device of the present invention, the hydraulic pressure control section controls operation of the assist hydraulic pressure generation mechanism so that the timing at which the assist hydraulic pressure is generated is the hydraulic pressure generation timing estimated by the estimation section.

Since the assist hydraulic pressure generation mechanism requires a certain amount of time from the start of operation until the assist pressure is generated, when operation of the assist hydraulic pressure generation mechanism is started at the hydraulic pressure generation timing, for example, the timing at which the assist hydraulic pressure is generated is later than the hydraulic pressure generation timing. Therefore, the hydraulic pressure control section controls the operation of the assist hydraulic pressure generation mechanism so that the timing at which the assist hydraulic pressure is generated becomes the hydraulic pressure generation timing. Consequently, the assist hydraulic pressure can be generated at the same time the master cylinder hydraulic pressure is generated, and discomfort in brake operation can be significantly reduced.

In another aspect of the braking control device of the present invention, the hydraulic pressure control section is configured so that driving of the pump is started at or before the hydraulic pressure generation timing, which is estimated by the estimation section on the basis of a brake operation before the master cylinder hydraulic pressure is generated.

A certain amount of time is required from the start of pump operation until the assist pressure is generated by the pressure of the pump. Consequently, in order to generate the assist hydraulic pressure at the hydraulic pressure generation timing, the pump must be driven in advance of the hydraulic pressure generation timing. However, the amount of energy consumed increases the earlier the driving of the pump is started. Therefore, driving of the pump is initiated by the time the hydraulic pressure generation timing occurs after the brake is operated, on the basis of brake operation prior to generation of the master cylinder pressure. The assist hydraulic pressure can thereby be generated precisely at the hydraulic pressure generation timing while keeping energy consumption as low as possible.

BRIEF DESCRIPTION OF THE DRAWINGS

FIG. 2 is a control block diagram showing the braking control device;

FIG. 3 is a graph showing the relationship between pressure and the amount of brake operation;

FIG. 4 is a graph showing the relationship between elapsed time and the amount of brake operation;

FIG. 5 is a timing chart showing the drive initiation timing of the hydraulic pressure pumps and the generation timing of the assist hydraulic pressure;

FIG. 7 is a flowchart showing the operation of a second embodiment.

DESCRIPTION OF THE PREFERRED EMBODIMENTS

Embodiments of the braking control device of the present invention will be described based on the accompanying drawings.

First Embodiment

Figure 1:
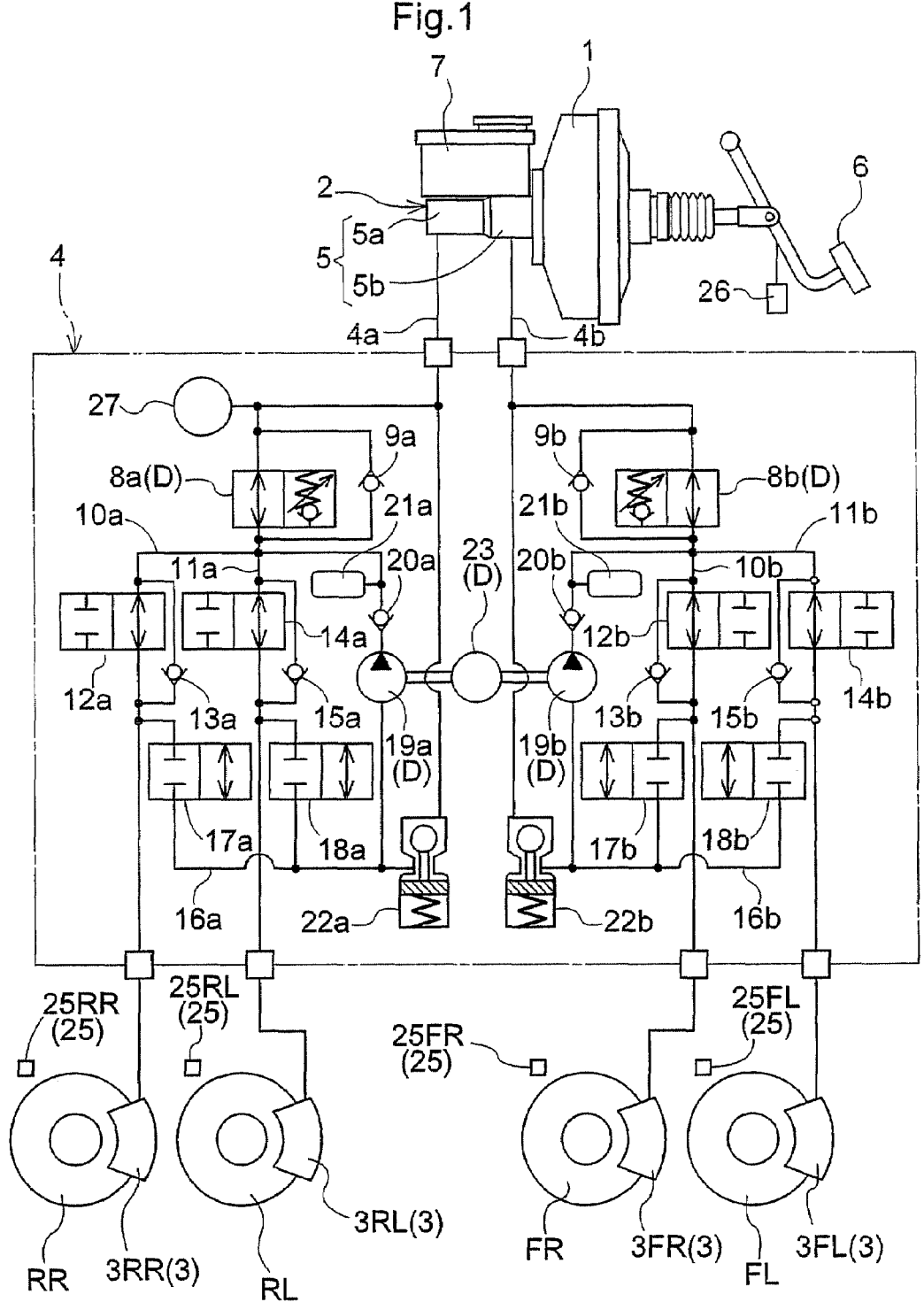
FIG. 1 is a schematic structural diagram showing the braking control device.

As shown in FIG. 1, the braking control device has a master cylinder 2 for amplifying a brake operation force and generating a master cylinder hydraulic pressure, and a hydraulic pressure circuit 4 for applying the master cylinder hydraulic pressure to a wheel cylinder 3 of each vehicle wheel.

Four vehicle wheels are provided, including a right front wheel FR, a left front wheel FL, a right rear wheel RR, and a left rear wheel RL, and wheel cylinders 3FR, 3FL, 3RR, 3RL are provided to the vehicle wheels FR, FL, RR, RL, respectively. The hydraulic pressure circuit 4 is configured so as to apply the master cylinder hydraulic pressure generated by the master cylinder 2 to each wheel cylinder 3.

The master cylinder 2 is a tandem-type cylinder provided with two hydraulic pressure chambers 5. The master cylinder 2 generates the master cylinder hydraulic pressure in each of the two hydraulic pressure chambers 5. A master reservoir 7 is provided for communicating with each of the two hydraulic pressure chambers 5 of the master cylinder 2. The master reservoir 7 feeds brake fluid to the master cylinder 2 and holds excess brake fluid of the master cylinder 2.

A booster device 1 is provided for amplifying the brake operation force of a brake pedal 6 and inputting the amplified brake operation force to the master cylinder 2. Although not shown in the drawing, the booster device 1 has two chambers, and when brake operating force is applied by the brake pedal 6, one chamber is pressurized to atmospheric pressure, and the other chamber becomes a negative pressure chamber through the use of the intake negative pressure of the engine. The booster device 1 is configured so as to push a piston rod of the master cylinder 2 in which the brake operating force is amplified, through the difference in pressure between the atmospheric pressure chamber and the negative pressure chamber.

The hydraulic pressure circuit 4 is composed of a first hydraulic pressure circuit 4a for communicating one hydraulic pressure chamber 5a of the master cylinder 2 with the wheel cylinder 3RR of the right rear wheel RR and the wheel cylinder 3RL of the left rear wheel RL; and a second hydraulic pressure circuit 4b for communicating the other hydraulic pressure chamber 5b of the master cylinder 2 with the wheel cylinder 3FR of the right front wheel FR and the wheel cylinder 3FL of the left front wheel FL.

The first hydraulic pressure circuit 4a is provided with a proportional differential pressure valve 8a that can switch between two positions that include a communicating position and a pressure differential position. In the differential pressure position, the proportional differential pressure valve 8a allows a differential pressure to occur between the hydraulic pressure on the side of the master cylinder 2 and the pressure on the side of the wheel cylinder 3 so that the hydraulic pressure on the side of the wheel cylinder 3 is higher than the hydraulic pressure on the side of the master cylinder 2. By adjusting the degree of opening of the proportional differential pressure valve 8a in the differential pressure position, the pressure difference between the hydraulic pressure on the side of the master cylinder 2 and the hydraulic pressure on the side of the wheel cylinder 3 can be adjusted. A differential pressure non-return valve 9a for allowing brake fluid to flow from the master cylinder 2 to the wheel cylinder 3 and preventing the brake fluid from flowing in the opposite direction is provided parallel to the proportional differential pressure valve 8a. The differential pressure non-return valve 9a is configured so as to allow brake fluid to flow from the master cylinder 2 to the wheel cylinder 3 and apply the master cylinder hydraulic pressure to the wheel cylinder 3 even when the proportional differential pressure valve 8a is closed.

The portion of the first hydraulic pressure circuit 4a further towards the wheel cylinders 3 than the proportional differential pressure valve 8a is branched into a first branch 10a and a second branch 11a, and the first branch 10a and the second branch 11a are connected to the wheel cylinders 3RR, 3RL, respectively. A first normally open control valve 12a that is normally open and able to switch between two positions that include a communicating position and a cutoff position is provided to the first branch 10a. A first non-return valve 13a for allowing brake fluid to flow from the wheel cylinder 3 to the master cylinder 2 and preventing the brake fluid from flowing in the opposite direction is provided parallel to the first normally open control valve 12a. In the same manner as in the first branch 10a, the second branch 11a is provided with a second normally open control valve 14a that corresponds to the first normally open control valve 12a, and a second non-return valve 15a that corresponds to the first non-return valve 13a.

A branch-merging channel 16a is provided at which the flow channel portion of the first branch 10a that is branched further towards the wheel cylinders 3 than the first normally open control valve 12a merges with the flow channel portion of the second branch 11a that is branched further towards the wheel cylinders 3 than the second normally open control valve 14a. A first normally closed control valve 17a, which is normally closed and able to switch between two positions that include a communicating position and a cutoff position, is provided in the branch-merging channel 16a in a flow channel portion that is branched from the first branch 10a. A second normally closed control valve 18a, which is normally closed and able to switch between two positions that include a communicating position and a cutoff position, is also provided in a flow channel portion that is branched from the second branch 11a. In the merging portion of the branch—merging channel 16a, a hydraulic pressure pump 19a, a third non-return valve 20a, and a damper 21a are provided in sequence, and are connected between the proportional differential pressure valve 8a in the first hydraulic pressure circuit 4a, and the first normally open control valve 12a and second normally open control valve 14a. The hydraulic pressure pump 19a is rotationally driven by a motor 23, and is configured so as to pressurize the brake fluid to a prescribed pressure and discharge the brake fluid. In the branch-merging channel 16a, a reservoir 22a is provided between the hydraulic pressure pump 19a, and the first normally closed control valve 17a and second normally closed control valve 18a. The reservoir 22a is connected between the master cylinder 2 and the proportional differential pressure valve 8a in the first hydraulic pressure circuit 4a.

The structure of the first hydraulic pressure circuit 4a in the hydraulic pressure circuit 4 is described above, but the first hydraulic pressure circuit 4a and the second hydraulic pressure circuit 4b have the same structure, and the same members as those provided to the first hydraulic pressure circuit 4a are also provided to the second hydraulic pressure circuit 4b. In other words, a proportional differential pressure valve 8b, a first normally open control valve 12b, a second normally open control valve 14b, a first normally closed control valve 17b, a second normally closed control valve 18b, a hydraulic pressure pump 19b, and other members are also provided to the second hydraulic pressure circuit 4b. For the same members, an "a" is added to the numerals indicating the members provided to the first hydraulic pressure circuit 4a, and a "b" is added to the numerals indicating the members provided to the second hydraulic pressure circuit 4b.

The "a" and "b" after each numeral will be omitted in the description hereinafter when referring to both the member provided to the first hydraulic pressure circuit 4a and the member provided to the second hydraulic pressure circuit 4b.

The motor 23 is configured so that the hydraulic pressure pump 19a provided to the first hydraulic pressure circuit 4a and the hydraulic pressure pump 19b provided to the second hydraulic pressure circuit 4b are rotationally driven by a single motor 23.

Vehicle wheel speed sensors 25 for detecting the speed of the vehicle wheels, a brake operation amount section 26 for detecting the amount of brake operation of the brake pedal 6, and a hydraulic pressure sensor 27 for detecting the master cylinder hydraulic pressure are provided. The vehicle wheel speed sensors 25 are composed of a vehicle wheel speed sensor 25FR corresponding to the right front wheel FR, a vehicle wheel speed sensor 25FL corresponding to the left front wheel FL, a vehicle wheel speed sensor 25RR corresponding to the right rear wheel RR, and a vehicle wheel speed sensor 25RL corresponding to the left rear wheel RL; and the speed of each vehicle wheel is separately detected by the vehicle wheel speed sensors 25. In the present embodiment, the hydraulic pressure sensor 27 is provided to the first hydraulic pressure circuit 4a, but the hydraulic pressure sensor 27 may also be provided to the second hydraulic pressure circuit 4b.

As shown in FIG. 2, the detection signals of the vehicle wheel speed sensors 25, the brake operation amount section 26, and the hydraulic pressure sensor 27 are each inputted to an electronic control unit 24. The electronic control unit 24 is composed of a microcomputer provided with a CPU, ROM, RAM, and an input/output section. The electronic control unit 24 is configured so as to control the wheel cylinder pressure applied to the wheel cylinders 3 by controlling the operation of the proportional differential pressure valves 8, the first normally open control valves 12, the second normally open control valves 14, the first normally closed control valves 17, the second normally closed control valves 18, and the motor 23 on the basis of the respective detection signals of the electronic control unit 24, the vehicle wheel speed sensors 25, the brake operation amount section 26, and the hydraulic pressure sensor 27.

The electronic control unit 24 is configured so as to control the wheel cylinder pressure by separately controlling the operations of the normally open control valves and normally closed control valves that correspond to each wheel cylinder 3.

For example, a case will be described in which the wheel cylinder pressure applied to the wheel cylinder 3RR of the right rear wheel RR is controlled.

When the wheel cylinder pressure is increased, the electronic control unit 24 causes the hydraulic pressure pump 19a to operate by operation of the motor 23, and controls the proportional differential pressure valve 8a. As shown in FIG. 1, the first normally open control valve 12a is placed in the communicating position, and the first normally closed control valve 17a is placed in the cutoff position. When the wheel cylinder pressure is maintained, the electronic control unit 24 switches the first normally open control valve 12a to the cutoff position and places the first normally closed control valve 17a to the cutoff position. When the wheel cylinder pressure is reduced, the electronic control unit 24 switches the first normally open control valve 12a to the cutoff position, and switches the first normally closed control valve 17a to the communicating position.

The assist hydraulic pressure generation mechanism D for adding an assist hydraulic pressure to the master cylinder hydraulic pressure in the hydraulic pressure circuit 4 is composed of the motor 23, the hydraulic pressure pumps 19, and the proportional differential pressure valves 8, and the hydraulic pressure pumps 19 correspond to the pumps.

The assist hydraulic pressure generation mechanism D causes the hydraulic pressure on the wheel cylinder 3 side to be higher than the hydraulic pressure on the master cylinder 2 side by switching the proportional differential pressure valves 8 to the differential pressure position, and adds the assist hydraulic pressure to the master cylinder hydraulic pressure in a state in which the hydraulic pressure pumps 19 are rotationally driven by the motor 23. The assist hydraulic pressure generation mechanism D controls the size of the assist hydraulic pressure by adjusting the speed of the hydraulic pressure pumps 19 and the degree of opening of the proportional differential pressure valves 8 that are switched to the differential pressure position.

As shown in FIG. 3, the master cylinder hydraulic pressure PMC with respect to the brake operation amount S has a jumping characteristic due to the operation of the booster device 1 and the master cylinder 2, whereby the master cylinder hydraulic pressure PMC is zero until the brake operation amount S reaches a prescribed amount S1, and when the brake operation amount S reaches the prescribed amount S1, the master cylinder hydraulic pressure PMC increases in stepped fashion from zero to a prescribed amount PMC1. When the brake operation amount S is greater than the prescribed amount S1, the master cylinder hydraulic pressure PMC varies according to the brake operation amount S through the operation of the booster device 1 and the master cylinder 2.

A brake operation detection section is provided that is capable of detecting operation of the brake before the master cylinder hydraulic pressure is generated. This brake operation detection section is the brake operation amount section 26 that acts as a brake operation amount detection section. As the brake operation detection section, a brake operation amount detection sensor or other detections may be employed. The electronic control unit 24 is provided with an estimation section 28 for estimating, based on the detection information of the brake operation amount section 26, the hydraulic pressure generation timing at which the master cylinder hydraulic pressure is generated; and a hydraulic pressure control section 29 for controlling the operation of the assist hydraulic pressure generation mechanism D by using the hydraulic pressure generation timing estimated by the estimation section 28 as a reference.

Since the pressure increases from zero to the prescribed amount PMC1 in stepped fashion, and the master cylinder hydraulic pressure PMC is generated when the brake operation amount S reaches the prescribed amount S1, the hydraulic pressure generation timing T is the timing at which the brake operation amount S reaches the prescribed amount S1. Therefore, the estimation section 28 estimates the hydraulic pressure generation timing T at which the brake operation amount S reaches the prescribed amount S1 on the basis of the detection information of the brake operation amount section 26 during the time taken for the brake operation amount S to reach the prescribed amount S1. To estimate the hydraulic pressure generation timing T, the estimation section 28 estimates the hydraulic pressure generation timing T according to the amount of variation of the brake operation amount S per a prescribed time based on the detection information of the brake operation amount section 26, for example. In other words, the estimation section 28 estimates the hydraulic pressure generation timing T so that the hydraulic pressure generation timing T occurs earlier the larger the amount of increase of the brake operation amount per prescribed time.

In the estimation of the hydraulic pressure generation timing T by the estimation section 28, the estimation section 28 computes an increase relationship R of the brake operation amount S over time on the basis of the variation of the brake operation amount S per prescribed time based on the detection information of the brake operation amount section 26, for example, as shown in FIG. 4. The estimation section 28 estimates, based on the computed increase relationship R, the time at which t1 has elapsed from the present time with the current brake operation amount Sa to be the hydraulic pressure generation timing T. In FIG. 4, the increase relationship R of the brake operation amount S over time is a linearly increasing relationship, but the relationship may also show a curved increase, and any relationship may be used.

The hydraulic pressure control section 29 initiates, driving of the hydraulic pressure pumps 19 by the time the hydraulic pressure generation timing T estimated by the estimation section 28 occurs based on the brake operation before the master cylinder hydraulic pressure is generated, and controls the operation of the assist hydraulic pressure generation mechanism D so that the timing at which the assist hydraulic pressure is generated is the hydraulic pressure generation timing T. At this time, the assist hydraulic pressure generated at the hydraulic pressure generation timing T estimated by the estimation section 28 is a preset prescribed hydraulic pressure PA1.

The drive initiation timing of the hydraulic pressure pumps 19 and the generation timing of the assist hydraulic pressure will be described based on the timing chart shown in FIG. 5A.

If the timing at which the brake is operated prior to the generation of the master cylinder hydraulic pressure is designated as the initial brake operation timing T1, the driving of the hydraulic pressure pumps 19 is started during the period from the initial brake operation timing T1 to the hydraulic pressure generation timing T. By driving the hydraulic pressure pumps 19 in this manner before the hydraulic pressure generation timing T, the assist hydraulic pressure can be generated without time being taken for the hydraulic pressure pumps 19 to come online after the hydraulic pressure generation timing T. Consequently, when the hydraulic pressure generation timing T occurs, the assist hydraulic pressure can be generated by controlling the operation of the assist hydraulic pressure generation mechanism D. Since driving of the hydraulic pressure pumps 19 is initiated after the initial brake operation timing T1, the assist hydraulic pressure can be generated at the hydraulic pressure generation timing T while minimizing the amount of energy consumed by driving the hydraulic pressure pumps 19.

Figure 6:
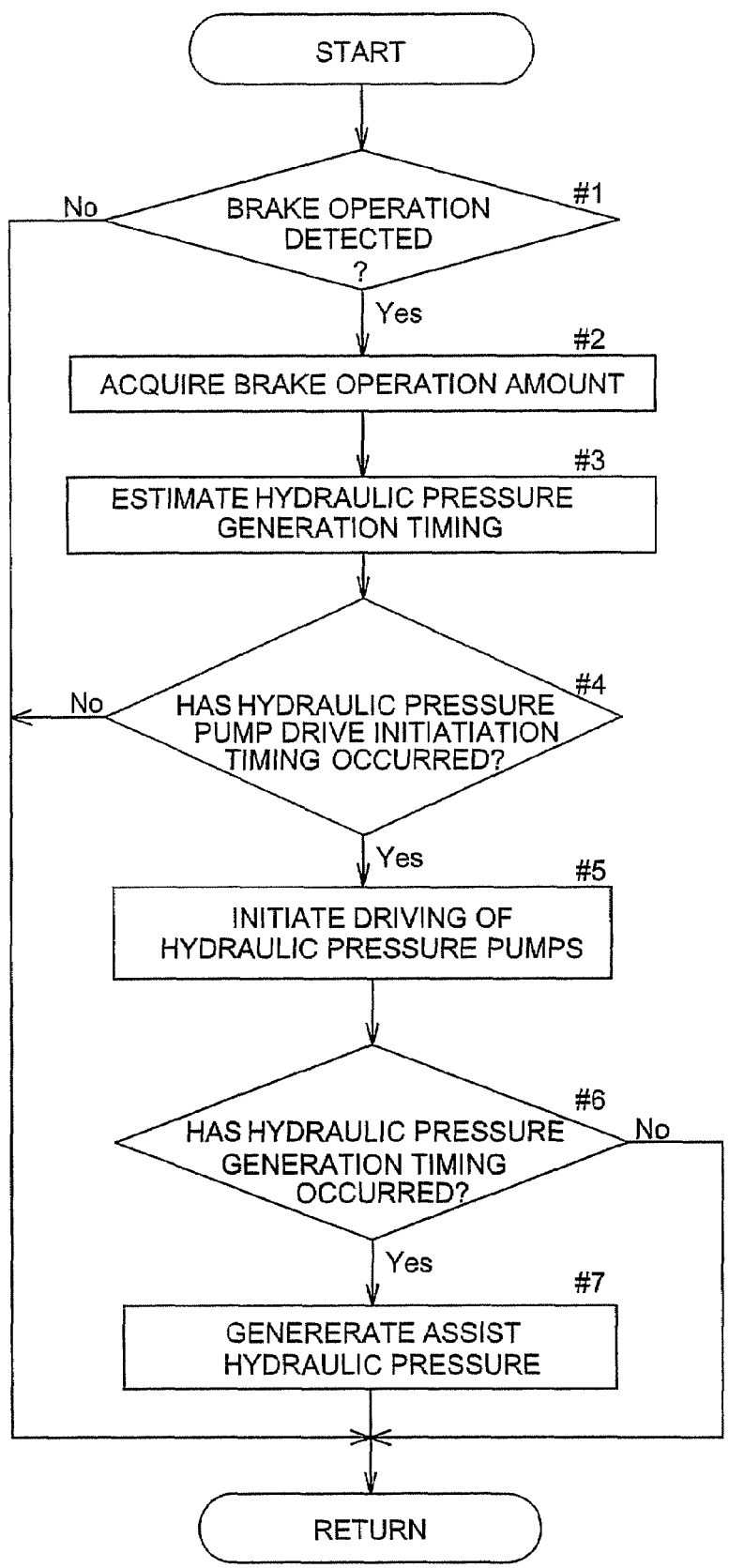
FIG. 6 is a flowchart showing the operation of a first embodiment.

The manner in which estimates are made by the estimation section 28 and in which the assist hydraulic pressure generation mechanism D is operated will be described based on the flowchart in FIG. 6.

When brake operation prior to generation of the master cylinder hydraulic pressure is detected from the detection signal of the brake operation amount section 26, the estimation section 28 acquires the brake operation amount S prior to generation of the master cylinder hydraulic pressure, and estimates the hydraulic pressure generation timing T on the basis of the acquired brake operation amount S (steps 1 through 3).

The hydraulic pressure control section 29 initiates driving of the hydraulic pressure pumps 19 when the hydraulic pressure pump drive initiation timing occurs a prescribed period of time prior to the hydraulic pressure generation timing T estimated by the estimation section 28 (steps 4 and 5). The prescribed period of time is the time taken for the speed of the hydraulic pressure pumps 19 to rise to the degree that the assist hydraulic pressure can be generated after driving of the pumps is started.

When the hydraulic pressure generation timing T estimated by the estimation section 28 occurs, the hydraulic pressure control section 29 adjusts the speed of the hydraulic pressure pumps 19, switches the proportional differential pressure valves 8 to the differential pressure position, and adjusts the degree of opening thereof, and the assist hydraulic pressure for the prescribed hydraulic pressure PA1 is generated (steps 6 and 7).

In this manner, when the assist hydraulic pressure for the prescribed hydraulic pressure PA1 is generated at the hydraulic pressure generation timing T as shown in FIG. 3, the hydraulic pressure control section 29 then controls the operation of the assist hydraulic pressure generation mechanism D on the basis of the detection information of the brake operation amount section 26. A first relationship Q between the brake operation amount S and the assist hydraulic pressure PA is set in advance so that the assist hydraulic pressure PA increases and decreases in accordance with the brake operation amount S. On the basis of the detection information of the brake operation amount section 26, the hydraulic pressure control section 29 computes the assist hydraulic pressure PA using the first relationship Q and controls the operation of the assist hydraulic pressure generation mechanism D so that the computed assist hydraulic pressure PA is added.

In FIG. 3, the first relationship Q is set so that the assist hydraulic pressure PA increases and decreases in linear fashion according to the brake operation amount S, but the setting adopted for the first relationship Q may be arbitrarily modified. For example, a setting may be adopted whereby the assist hydraulic pressure PA increases and decreases in a curve according to the brake operation amount S.

Second Embodiment

The second embodiment is another embodiment of the assist hydraulic pressure generation timing and the drive initiation timing of the hydraulic pressure pumps 19 in the first embodiment. Other aspects of the present embodiment are the same as in the first embodiment, and will not be described.

The following description is based on the timing chart shown in FIG. 5B.

At the hydraulic pressure generation timing T estimated by the estimation section 28, the hydraulic pressure control section 29 initiates driving of the hydraulic pressure pumps 19 and controls the operation of the assist hydraulic pressure generation mechanism D. Since the driving of the hydraulic pressure pumps 19 is started after the hydraulic pressure generation timing T has occurred in this case, the timing at which the assist hydraulic pressure is generated is delayed with respect to the hydraulic pressure generation timing T by an amount commensurate with the time taken for the hydraulic pressure pumps 19 to come online. However, since the computational processing for estimating the hydraulic pressure generation timing has been completed prior to the hydraulic pressure generation timing T, there is no time delay caused by the computational processing.

The following description is based on the flowchart shown in FIG. 7.

When brake operation prior to generation of the master cylinder hydraulic pressure is detected from the detection signal of the brake operation amount section 26, the estimation section 28 acquires the brake operation amount S prior to generation of the master cylinder hydraulic pressure, and estimates the hydraulic pressure generation timing T on the basis of the acquired brake operation amount S (steps 11 through 13).

When the hydraulic pressure generation timing T estimated by the estimation section 28 occurs, the hydraulic pressure control section 29 initiates driving of the hydraulic pressure pumps 19 to adjust the speed thereof, switches the proportional differential pressure valves 8 to the differential pressure position to adjust the degree of opening thereof, and causes the assist hydraulic pressure for the prescribed hydraulic pressure PA1 to be generated (steps 14 and 15).

Third Embodiment

The third embodiment is another embodiment of the assist hydraulic pressure generation timing and the drive initiation timing of the hydraulic pressure pumps 19 in the first embodiment. Other aspects of the present embodiment are the same as in the first embodiment, and will not be described.

The following description is based on the timing chart shown in FIG. 5C.

The timing at which a brake operation is performed prior to generation of the master cylinder hydraulic pressure is the initial brake operation timing T1, and the hydraulic pressure control section 29 initiates driving of the hydraulic pressure pumps 19 prior to the initial brake operation timing T1. Since the hydraulic pressure pumps 19 are thus driven before the hydraulic pressure generation timing T occurs, the assist hydraulic pressure can be generated without time being taken for the hydraulic pressure pumps 19 to come online after the hydraulic pressure generation timing T has occurred. Consequently, the assist hydraulic pressure can be generated by controlling the operation of the assist hydraulic pressure generation mechanism D when the hydraulic pressure generation timing T occurs.

In this case, since driving of the hydraulic pressure pumps 19 must be started before the initial brake operation timing T1, the hydraulic pressure control section 29 drives the hydraulic pressure pumps 19 in advance at a low speed. As an example of the timing at which driving of the hydraulic pressure pumps 19 is initiated, driving of the hydraulic pressure pumps 19 may be initiated when the hydraulic pressure control section 29 detects a release of accelerator pedal operation on the basis of the detection information of a pedal sensor, throttle opening sensor, or other sensor for detecting the operation state of the accelerator pedal. The hydraulic pressure control section 29 may also cause the hydraulic pressure pumps 19 to be driven at all times.

The operation of the third embodiment differs from that of the second embodiment only with respect to the details of step 15 in the flowchart shown in FIG. 7. Therefore, only the differing points will be described, and the content of the flowchart will not be described.

Specifically, since driving of the hydraulic pressure pumps 19 is initiated before the brake is operated, when the hydraulic pressure generation timing T estimated by the estimation section 28 occurs, the hydraulic pressure control section 29 adjusts the speed of the hydraulic pressure pumps 19 already being driven, switches the proportional differential pressure valves 8 to the differential pressure position to adjust the degree of opening thereof, and causes the assist hydraulic pressure for the prescribed hydraulic pressure PA1 to be generated.

Other Embodiments (1) In the first through third embodiments described above, the brake operation amount section 26, which operates as a brake operation amount detection section, is used as the brake operation detection section capable of detecting operation of the brake before the master cylinder hydraulic pressure is generated. Alternatively, a brake operation degree detection section for detecting the degree of brake operation in order to add the assist hydraulic pressure may be provided separately from the brake operation detection section.

In this case, the brake operation detection section is a sensor for detecting an ON/OFF state of brake operation, or any of other detection. The brake operation degree detection section is any of the brake operation amount section 26, the hydraulic pressure sensor 27 for detecting the master cylinder hydraulic pressure, a depressing force section for detecting the brake operating force, or other detections. When the brake operation degree detection section is the hydraulic pressure sensor 27, the relationship between the master cylinder hydraulic pressure and the assist hydraulic pressure is set in advance so that the assist hydraulic pressure increases and decreases in accordance with the master cylinder hydraulic pressure. The hydraulic pressure control section 29 computes the assist hydraulic pressure according to the preset relationship between the master cylinder hydraulic pressure and the assist hydraulic pressure on the basis of the detection information of the hydraulic pressure sensor 27, and controls the operation of the assist hydraulic pressure generation mechanism D so that the computed assist hydraulic pressure is added.

(2) In the first through third embodiments described above, the brake operation amount section 26 is provided, and the brake operation amount section 26 is made to function as a brake operation detection section, but a depressing force section for detecting the brake operation force may instead be provided, and the depressing force section may be made to function as a brake operation detection section.

(3) In the first through third embodiments described above, the hydraulic pressure circuit 4 may also be configured so that the master cylinder hydraulic pressure is applied to the wheel cylinders 3FR, 3RL provided to the right front wheel FR and the left rear wheel RL, respectively, in the first hydraulic pressure circuit 4a, and that the master cylinder hydraulic pressure is applied to the wheel cylinders 3FL, 3RR provided to the left front wheel FL and the right rear wheel RR, respectively, in the second hydraulic pressure circuit 4b. In other words, the configuration in which the master cylinder hydraulic pressure is applied to the wheel cylinders in the hydraulic pressure circuit 4 may be arbitrarily modified.

The present invention may be applied to various types of braking control devices that are capable of minimizing braking discomfort applied to the driver, and that are provided with a hydraulic pressure circuit for applying a master cylinder hydraulic pressure generated by a master cylinder to the wheel cylinders of vehicle wheels, and applying an assist hydraulic pressure generation mechanism for adding an assist hydraulic pressure to the master cylinder hydraulic pressure by using the pressure of a pump in the hydraulic pressure circuit.

[KEY]
2 master cylinder
3 wheel cylinder
4 hydraulic pressure circuit
26 brake operation detection section and brake operation amount detection section
28 estimation section
29 hydraulic pressure control section
D assist hydraulic pressure generation mechanism

What is claimed is:

1. A braking control device for a vehicle having a master cylinder for amplifying a brake operating force and generating a prescribed master cylinder hydraulic pressure, a hydraulic circuit for applying the prescribed master cylinder hydraulic pressure to a wheel cylinder of each vehicle wheel, and an assist hydraulic pressure generation mechanism for adding an assist hydraulic pressure to the prescribed master cylinder hydraulic pressure through pressure of a pump in the hydraulic circuit,
the braking control device comprising:
a brake operation detection section for detecting a brake operation before the prescribed master cylinder hydraulic pressure is generated;
an estimation section for estimating a hydraulic pressure generation timing at which the prescribed master cylinder hydraulic pressure is generated, on the basis of detection information of the brake operation detection section; and
a hydraulic pressure control section for controlling operation of the assist hydraulic pressure generation mechanism by using the hydraulic pressure generation timing estimated by the estimation section as a reference.

2. The braking control device according to claim 1, wherein
the brake operation detection section detects a brake operation amount; and
the hydraulic pressure control section controls the assist hydraulic pressure generation mechanism to add the assist hydraulic pressure on the basis of detection information of the brake operation amount detection section.

3. The braking control device according to claim 2, wherein the estimation section is configured so as to estimate the hydraulic pressure generation timing according to an amount of variation of the brake operation amount per a prescribed time on the basis of the detection information of the brake operation amount detection section.

4. The braking control device according to claim 1, further comprising a brake operation degree detection section, instead of the brake operation detection section, for detecting a degree of brake operation in order to add the assist hydraulic pressure.

5. The braking control device according to claim 1, wherein the hydraulic pressure control section controls operation of the assist hydraulic pressure generation mechanism so that the timing at which the assist hydraulic pressure is generated is the hydraulic pressure generation timing estimated by the estimation section.

6. The braking control device according to claim 5, wherein the hydraulic pressure control section is configured so that driving of the pump is started at or before the hydraulic pressure generation timing, which is estimated by the estimation section on the basis of a brake operation before the prescribed master cylinder hydraulic pressure is generated.

* * * * *